(12) United States Patent
Lai et al.

(10) Patent No.: US 12,119,168 B2
(45) Date of Patent: Oct. 15, 2024

(54) WIRELESS POWER-CHARGING MODULE

(71) Applicant: Delta Electronics, Inc., Taoyuan (TW)

(72) Inventors: Yu-Chun Lai, Taoyuan (TW);
Chun-Ching Yen, Taoyuan (TW);
Huai-Pei Tung, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 16 days.

(21) Appl. No.: 18/192,187

(22) Filed: Mar. 29, 2023

(65) Prior Publication Data
US 2024/0234027 A1    Jul. 11, 2024

(51) Int. Cl.
*H01F 38/14* (2006.01)
*H02J 50/10* (2016.01)

(52) U.S. Cl.
CPC .............. *H01F 38/14* (2013.01); *H02J 50/10* (2016.02)

(58) Field of Classification Search
CPC ................................. H01F 38/14; H02J 50/10
See application file for complete search history.

(56) References Cited

FOREIGN PATENT DOCUMENTS

| CN | 106464023 B | 1/2019 |
|---|---|---|
| CN | 212210614 U | 12/2020 |
| TW | 201714382 A | 4/2017 |

OTHER PUBLICATIONS

Office Action and Search Report of its corresponding TW application No. 112101176 (issued on Feb. 6, 2024).

*Primary Examiner* — Robert L Deberadinis
(74) *Attorney, Agent, or Firm* — MUNCY, GEISSLER, OLDS & LOWE, PC

(57) ABSTRACT

A wireless power-charging module is provided, including a magnetic core, a coil, and a magnetic glue, wherein a gap is formed between the magnetic core and the coil. The coil and the magnetic glue are disposed on the surface of the magnetic core, wherein the magnetic glue fills the gap between the magnetic core and the coil.

10 Claims, 16 Drawing Sheets

WIRELESS POWER-CHARGING MODULE

CROSS REFERENCE TO RELATED APPLICATIONS

This Application claims priority of China Patent Application No. 202310042760.8, filed on Jan. 11, 2023, the entirety of which is incorporated by reference herein.

BACKGROUND OF THE INVENTION

Field of the Invention

The present invention relates to wireless power-charging module, and, in particular, to a wireless power-charging module that has magnetic glue.

Description of the Related Art

FIG. 1 is a cross-sectional view of a conventional wireless power charging assembly. As shown in FIG. 1, the conventional wireless power charging assembly includes a wireless power charging receiver 10 and a wireless power charging transmitter 20. The wireless power charging receiver 10 has a magnetic core 11 and a coil 12 disposed on the magnetic core 11, wherein the coil 12 is electrically connected to a battery B. Additionally, the wireless power charging transmitter 20 has a magnetic core 21 and a coil 22 disposed on the magnetic core 21. When a current signal is applied to the coil 22 by an external power source, the coil 12 of the wireless power charging receiver 10 can generate an induced voltage for charging the battery B.

However, with the limitation to the size and structure of the conventional wireless power charging assembly, it would be difficult to increase the magnetic coupling coefficient of the two coils 12 and 22 and the induced voltage in the coil 12.

Moreover, as the magnetic cores 11 and 21 usually have considerable dimensions, miniaturization of the product would be difficult, and thus leading to inconvenience to the users.

Therefore, to design a wireless power-charging module with high power charging efficiency and compact size becomes a challenge.

BRIEF SUMMARY OF THE INVENTION

An embodiment of the present invention provides a wireless power-charging module that includes a magnetic core, a coil disposed on the surface of the magnetic core, and a magnetic glue. The magnetic glue is disposed on the surface of the magnetic core, filling the gap between the magnetic core and the coil.

In some embodiments, the magnetic core has a protrusion at the center of the magnetic core, an annular wall, and an annular recess formed between the wall and the protrusion.

In some embodiments, the protrusion forms a through hole.

In some embodiments, the magnetic core also has an opening formed on the wall, and the coil extends through the opening.

In some embodiments, the surface is the bottom surface of the recess, and the magnetic glue is spread over the entire bottom surface.

In some embodiments, the surface is the bottom surface of the recess, and the magnetic glue extends from the bottom surface to the lateral surface of the recess, wherein the lateral surface is adjacent to the bottom surface.

In some embodiments, the magnetic glue is spread over the entire lateral surface.

In some embodiments, the magnetic core has a flat structure that forms a through hole, and the coil surrounds the through hole.

In some embodiments, the magnetic glue has ferrite, ferrite alloy, amorphous alloy, or nanocrystalline alloy.

In some embodiments, the coil is a planar coil.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the wireless power-charging module are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
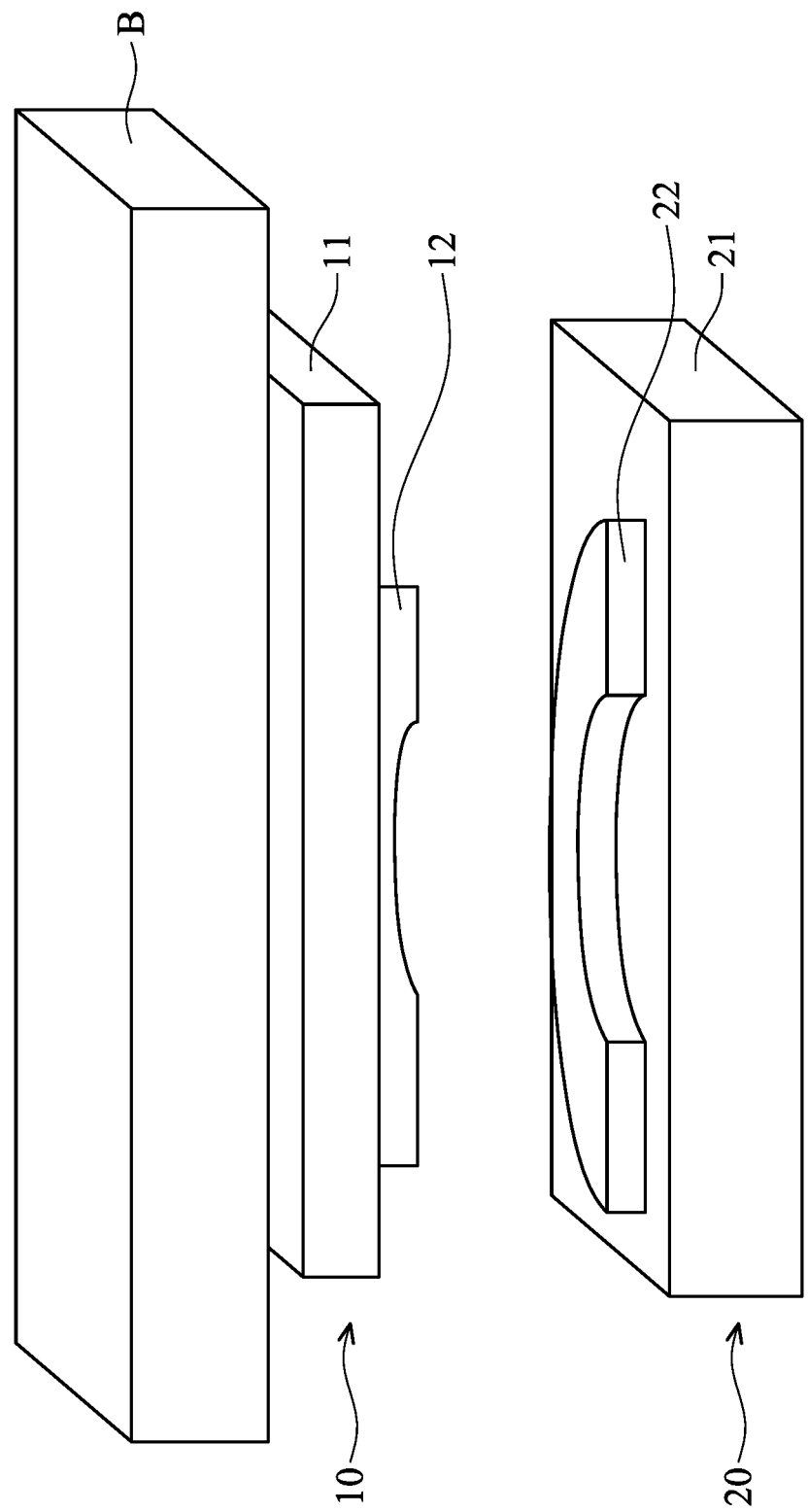
FIG. 1 is a cross-sectional view of a conventional wireless power charging assembly.
Figure 2:
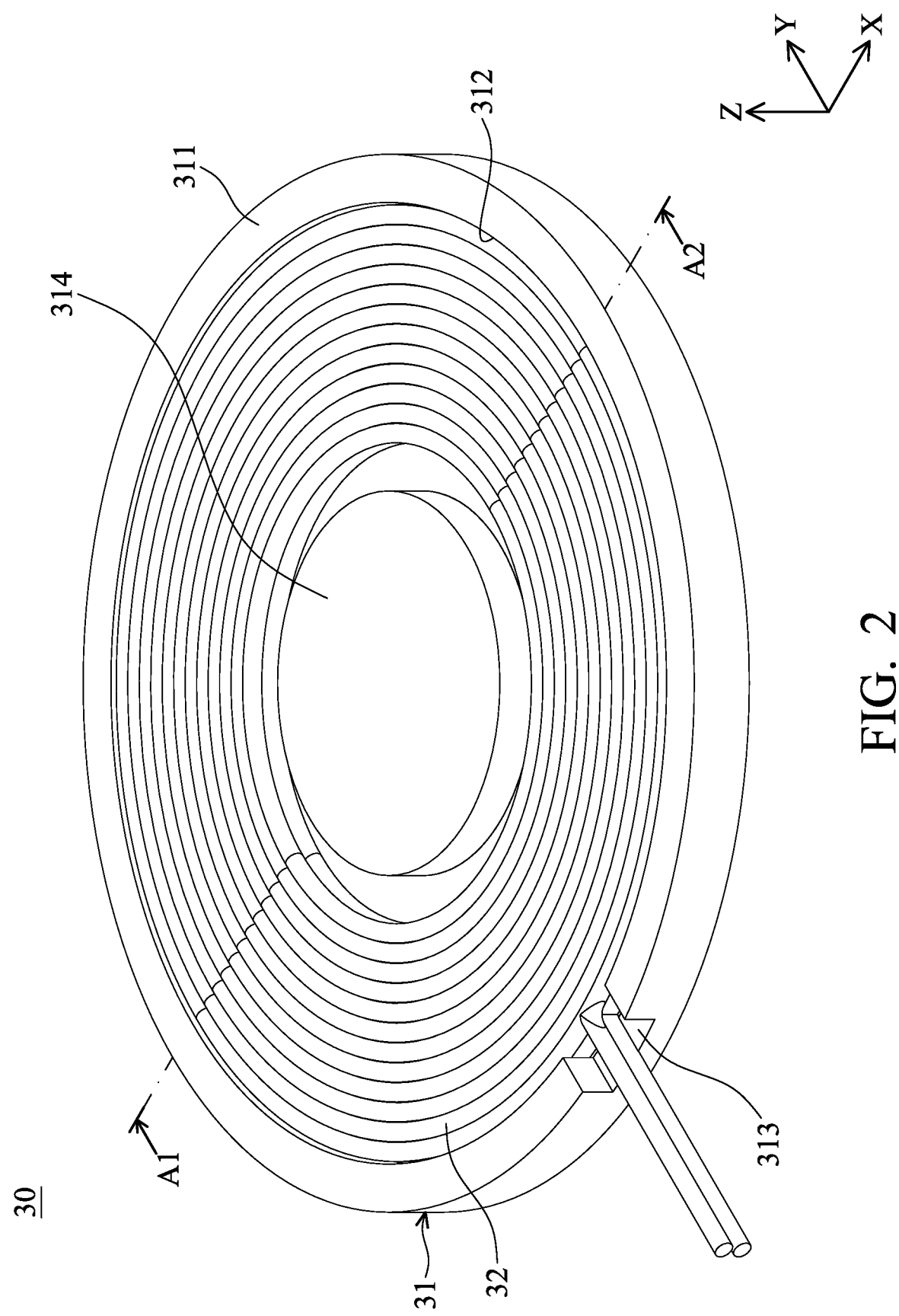
FIG. 2 is a perspective diagram of a wireless power-charging module 30 in accordance with an embodiment of the invention.
Figure 3:
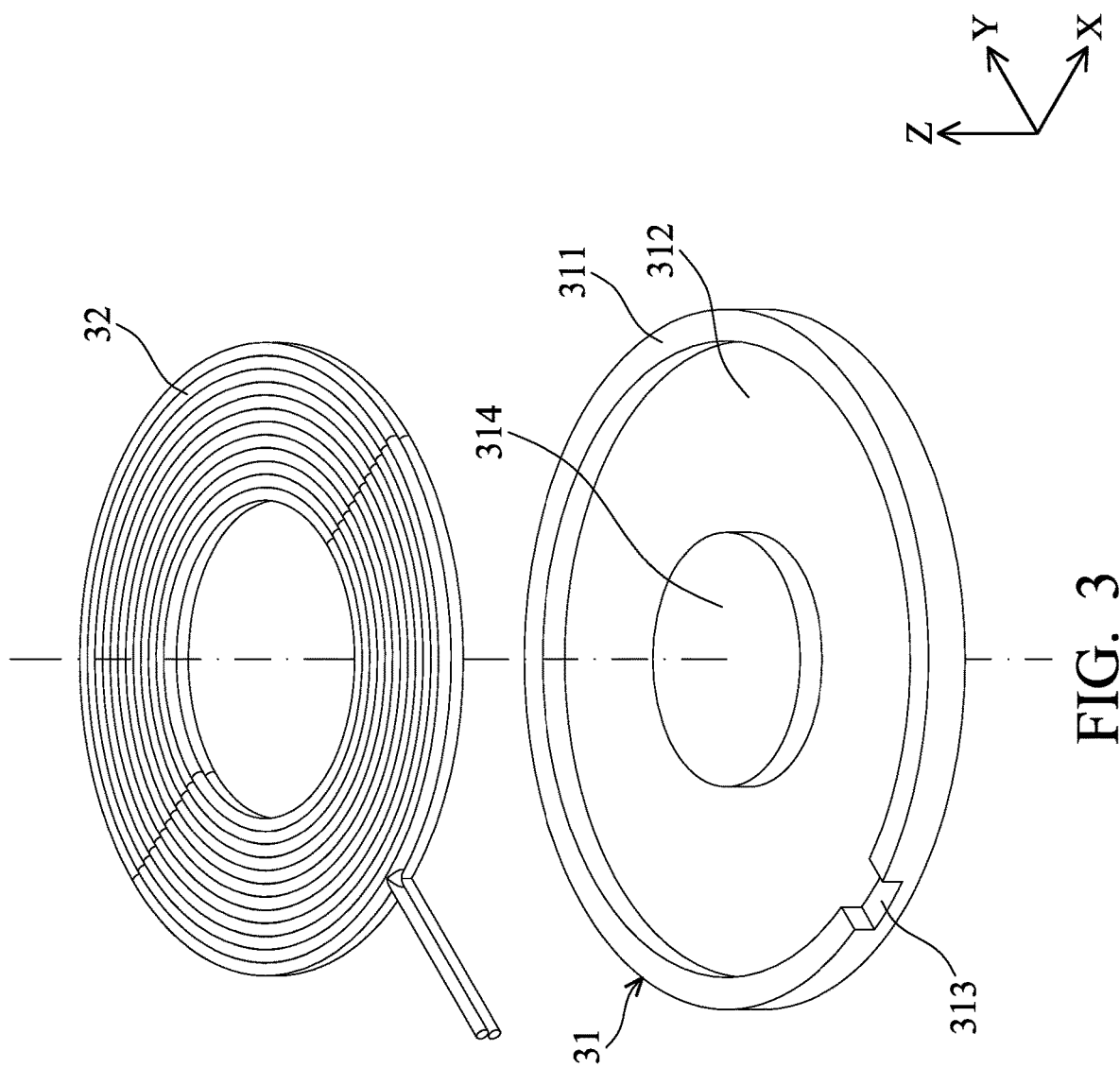
FIG. 3 is an exploded diagram of the wireless power-charging module 30 in FIG. 2.
Figure 4:
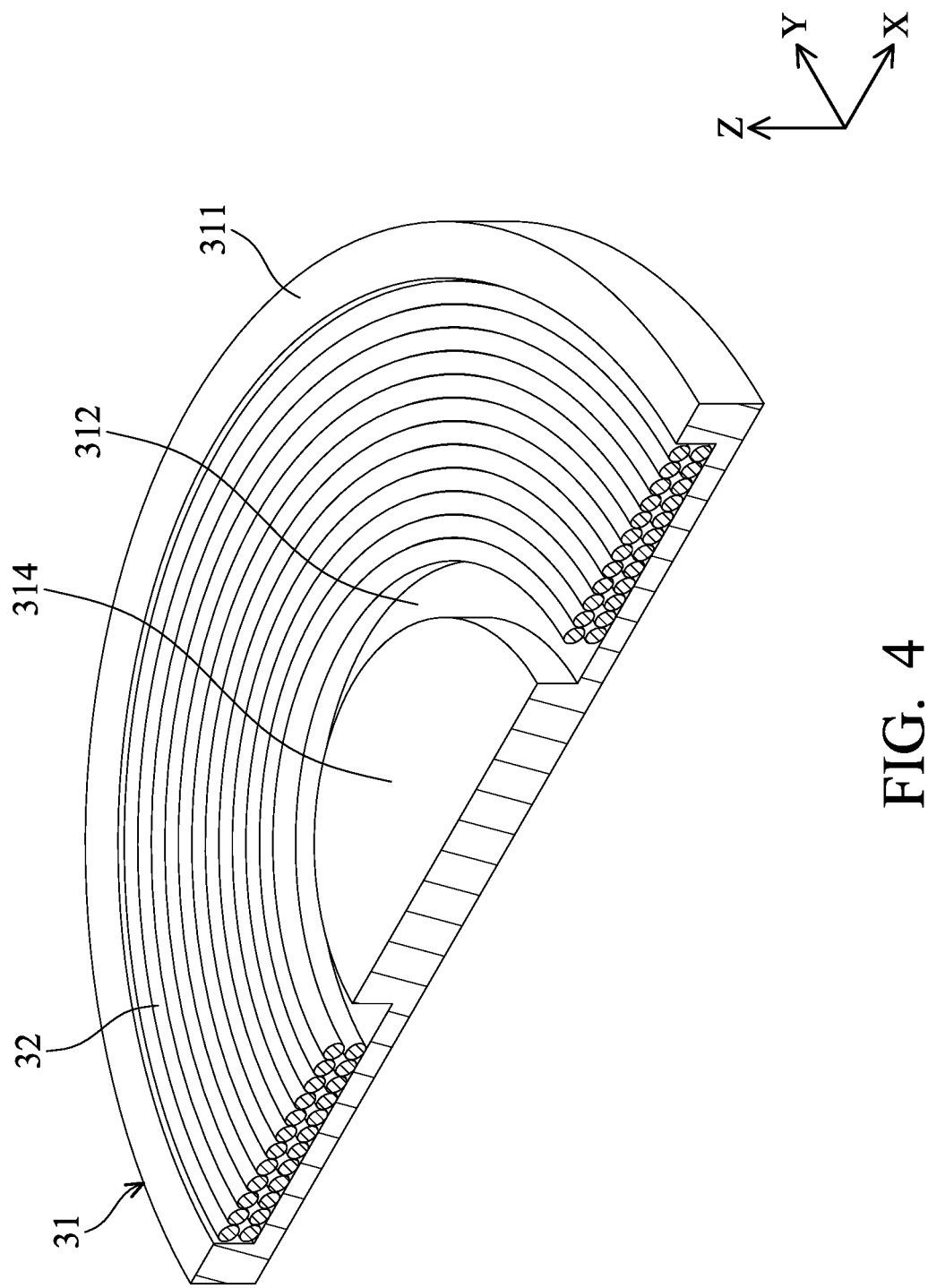
FIG. 4 is a cross-sectional view of the wireless power-charging module 30 taken along line A1-A2 in FIG. 2.
Figure 5:
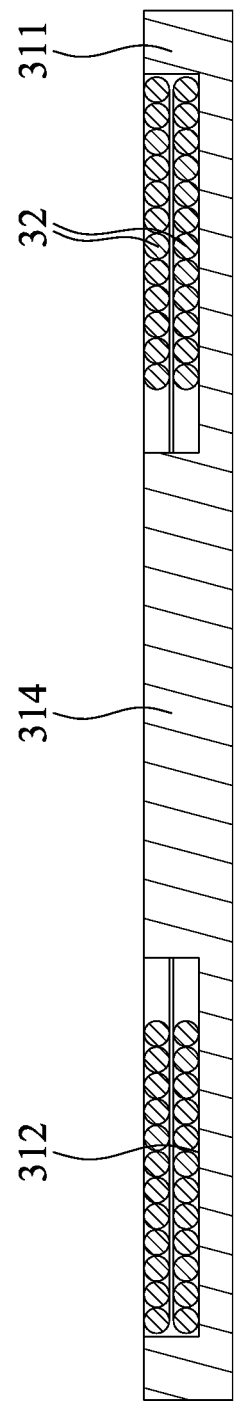
FIG. 5 is another cross-sectional view of the wireless power-charging module 30 taken along line A1-A2 in FIG. 2.

FIG. 2 is a perspective diagram of a wireless power-charging module 30 in accordance with an embodiment of the invention. FIG. 3 is an exploded diagram of the wireless power-charging module 30 in FIG. 2. FIG. 4 is a cross-sectional view of the wireless power-charging module 30 taken along line A1-A2 in FIG. 2. FIG. 5 is another cross-sectional view of the wireless power-charging module 30 taken along line A1-A2 in FIG. 2.

Referring to FIGS. 2-5, the wireless power-charging module 30 is a wireless power charging transmitter that can be coupled to a wireless power charging receiver for charging a battery.

In this embodiment, the wireless power-charging module 30 comprises a magnetic core 31 and a coil 32. The magnetic core 31 has an annular wall 311, an annular recess 312, an opening 313, and a protrusion 314 at the center of the magnetic core 31. The opening 313 is formed on the wall 311, and the recess 312 is formed between the wall 311 and the protrusion 314.

During assembly, the coil 32 is disposed in the recess 312 and surrounds the protrusion 314. Two ends of the coil 32 pass through the opening 313 to electrically connect to an external power source (not shown). When the coil 32 is energized by a current signal from the external power source, the wireless power-charging module 30 can generate a charging magnetic field. Here, the coil 32 may have a single-layer or multi-layer structure, but the invention is not limited to the embodiments described above.

Figure 6:
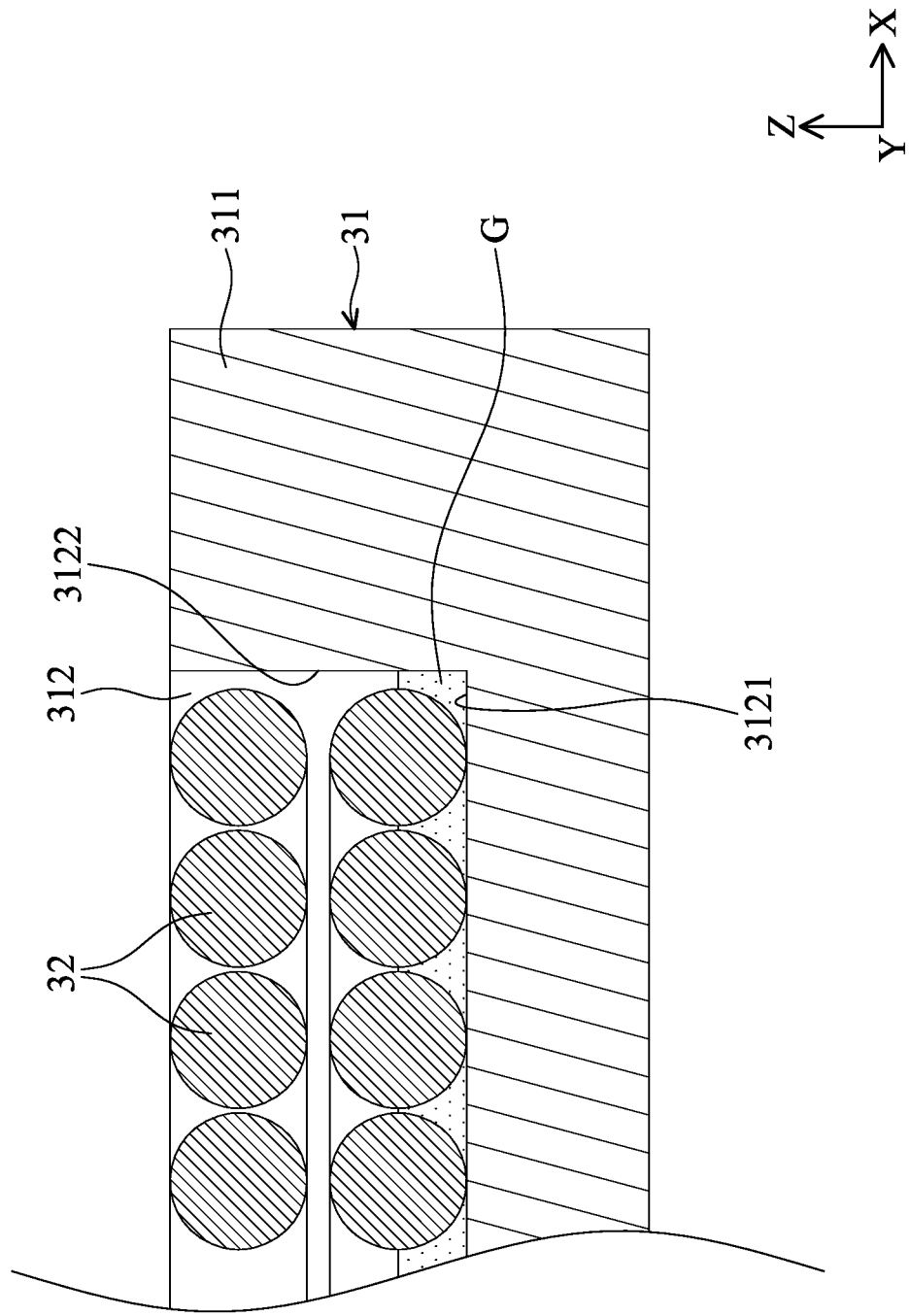
FIG. 6 is a partial cross-sectional view of the magnetic glue G dispensed on the surface of the recess 312 of the magnetic core 31.

FIG. 6 is a partial cross-sectional view of the magnetic glue G dispensed on the surface of the recess 312 of the magnetic core 31.

Referring to FIG. 6, to produce high induced voltage in the coil of the wireless power charging receiver, the magnetic glue G is applied to the surface of the recess 312. In this embodiment, the magnetic glue G comprises magnetic permeable material.

It should be noted that the magnetic glue G not only connects the coil 32 to the magnetic core 31, but also enhances the magnetic field strength of the wireless power-charging module 30 in the Z direction (vertical direction). Thus, charging efficiency and miniaturization of the magnetic core 31 and the wireless power-charging module 30 can be greatly improved.

In some embodiments, the coil 32 may comprise planar coil. The magnetic glue G may comprise ferrite, ferrite alloy, amorphous alloy, nanocrystalline alloy, or another glue or powder with high magnetic permeability, but the invention is not limited to the embodiments described above.

As shown in FIG. 6, the magnetic glue G is dispensed on the bottom surface 3121 of the recess 312. In this embodiment, the bottom surface 3121 of the recess 312 is entirely covered by the magnetic glue G. Furthermore, the magnetic glue G extends from the bottom surface 3121 to the lateral surface 3122 of the recess 312, wherein the lateral surface 3122 is adjacent to the bottom surface 3121. Here, the lateral surface 3122 of the recess 312 is not entirely covered by the magnetic glue G, and the magnetic glue G does not extend to the top side of the coil 32, thus achieving high magnetic field strength of the wireless power-charging module 30 in the Z direction (vertical direction).

Figure 7:
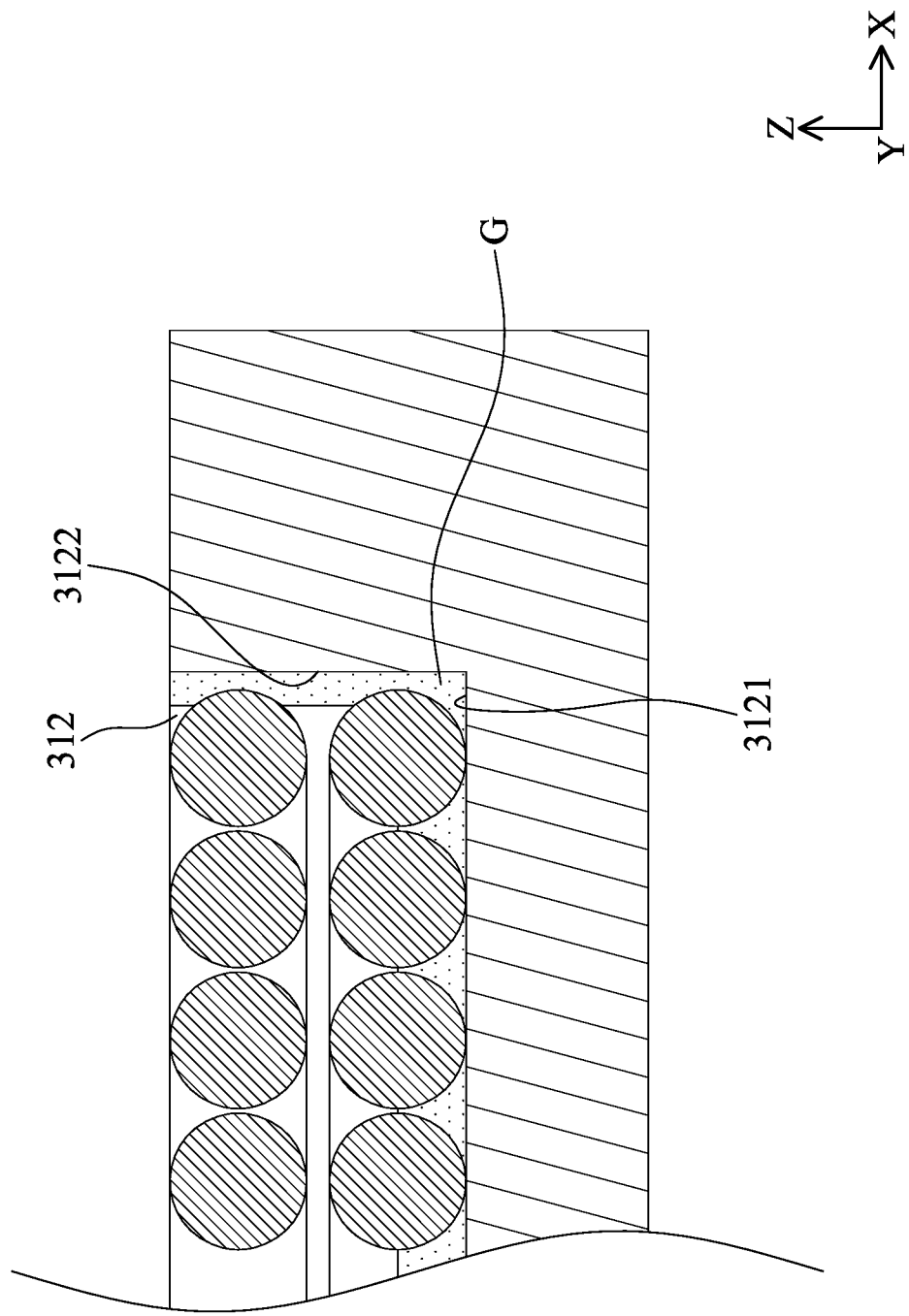
FIG. 7 is a partial cross-sectional view of the magnetic glue G that is spread over the entire bottom surface 3121 and the entire lateral surface 3122 of the recess 312, in accordance with another embodiment of the invention.

FIG. 7 is a partial cross-sectional view of the magnetic glue G that is spread over the entire bottom surface 3121 and the entire lateral surface 3122 of the recess 312, in accordance with another embodiment of the invention.

Referring to FIG. 7, the magnetic glue G in this embodiment may be spread over the entire bottom surface 3121 and the entire lateral surface 3122 of the recess 312, whereby the multilayer coil 32 can be firmly affixed in the recess 312.

In this embodiment, the magnetic glue G and the coil 32 have substantially the same height, and the magnetic glue G does not block the top side of the coil 32, thereby ensuring high magnetic field strength in the Z direction (vertical direction) and high power charging efficiency of the wireless power-charging module 30.

Figure 8:
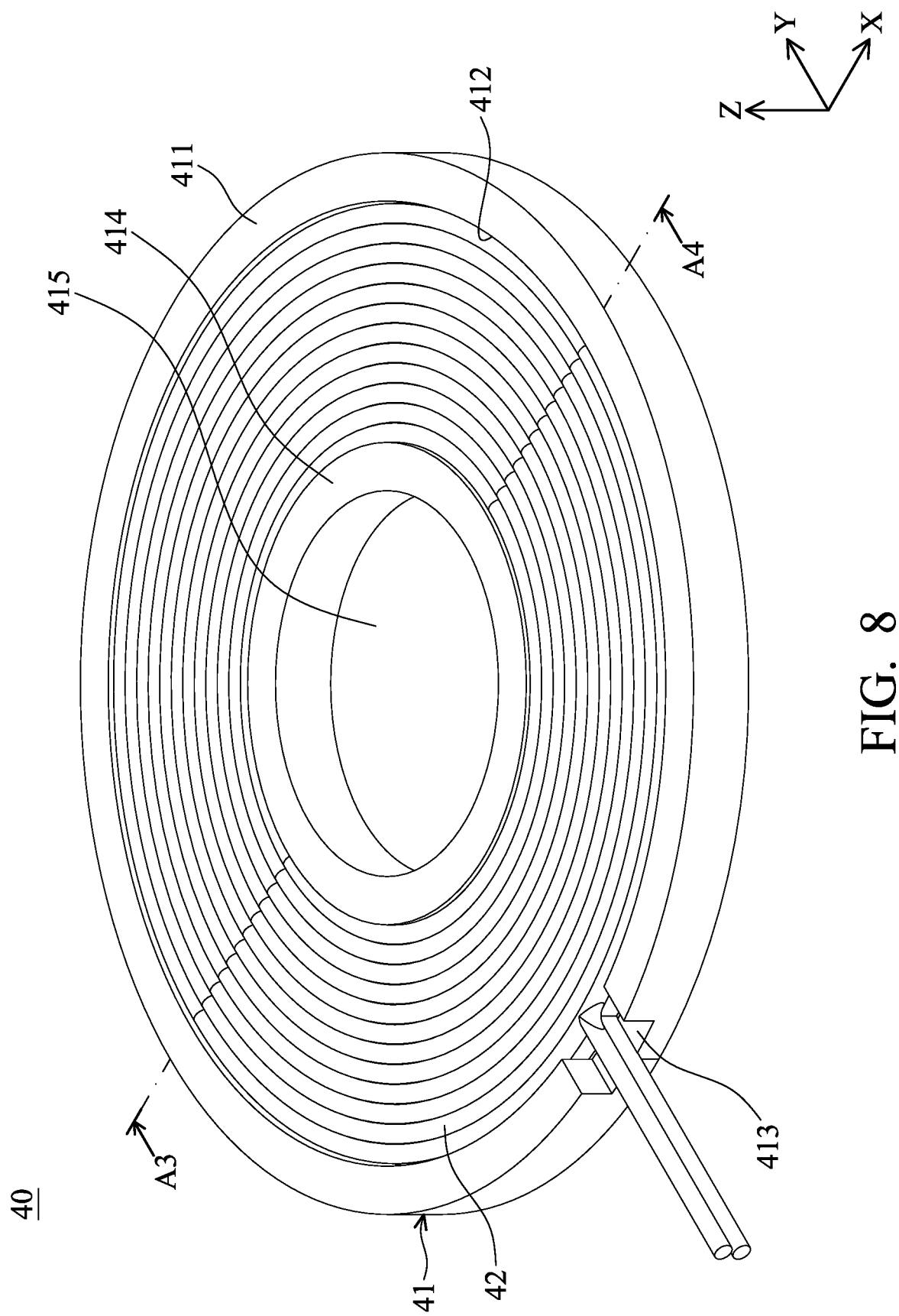
FIG. 8 is a perspective diagram of a wireless power-charging module 40 in accordance with another embodiment of the invention.
Figure 9:
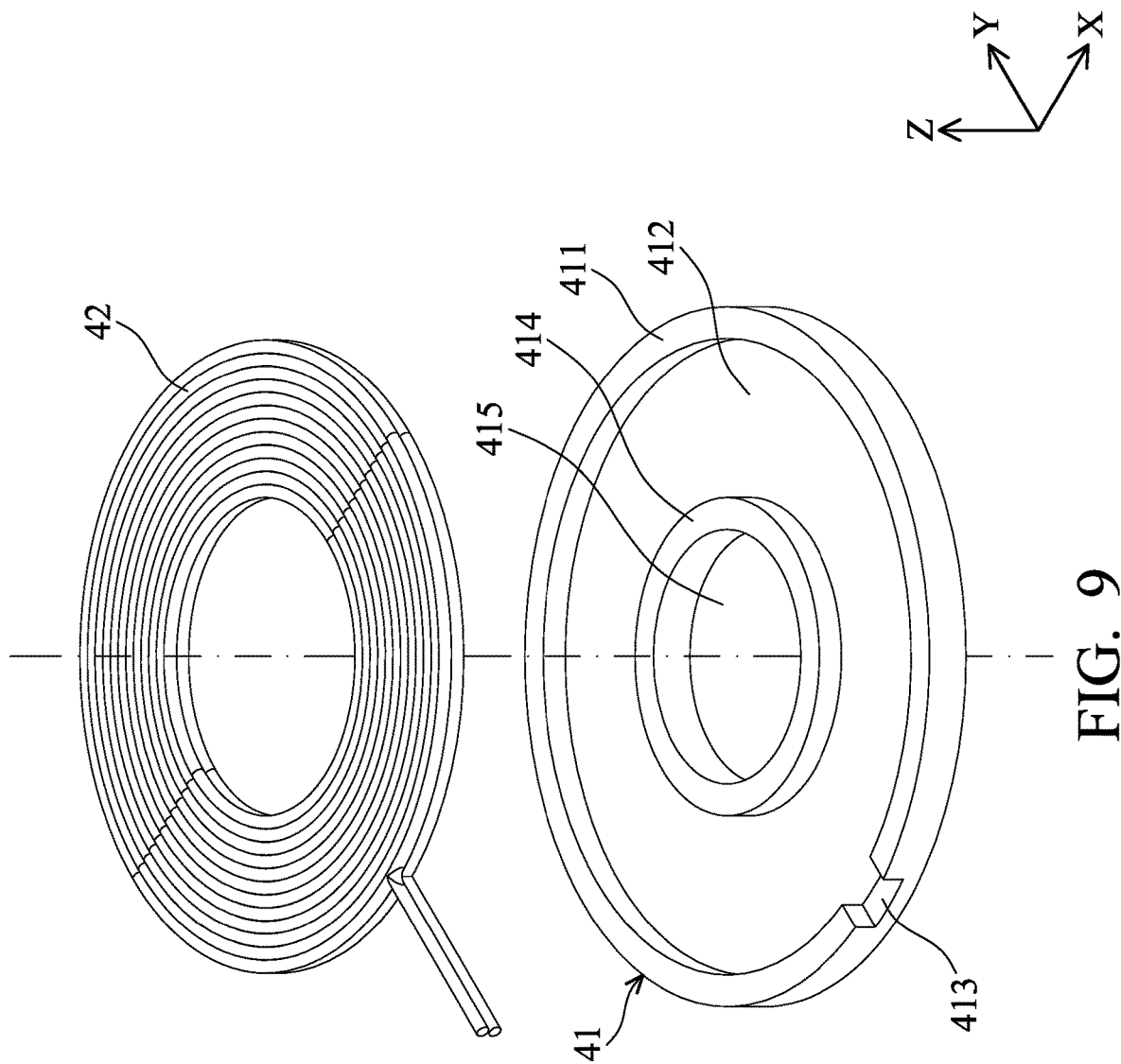
FIG. 9 is an exploded diagram of the wireless power-charging module 40 in FIG. 8.
Figure 10:
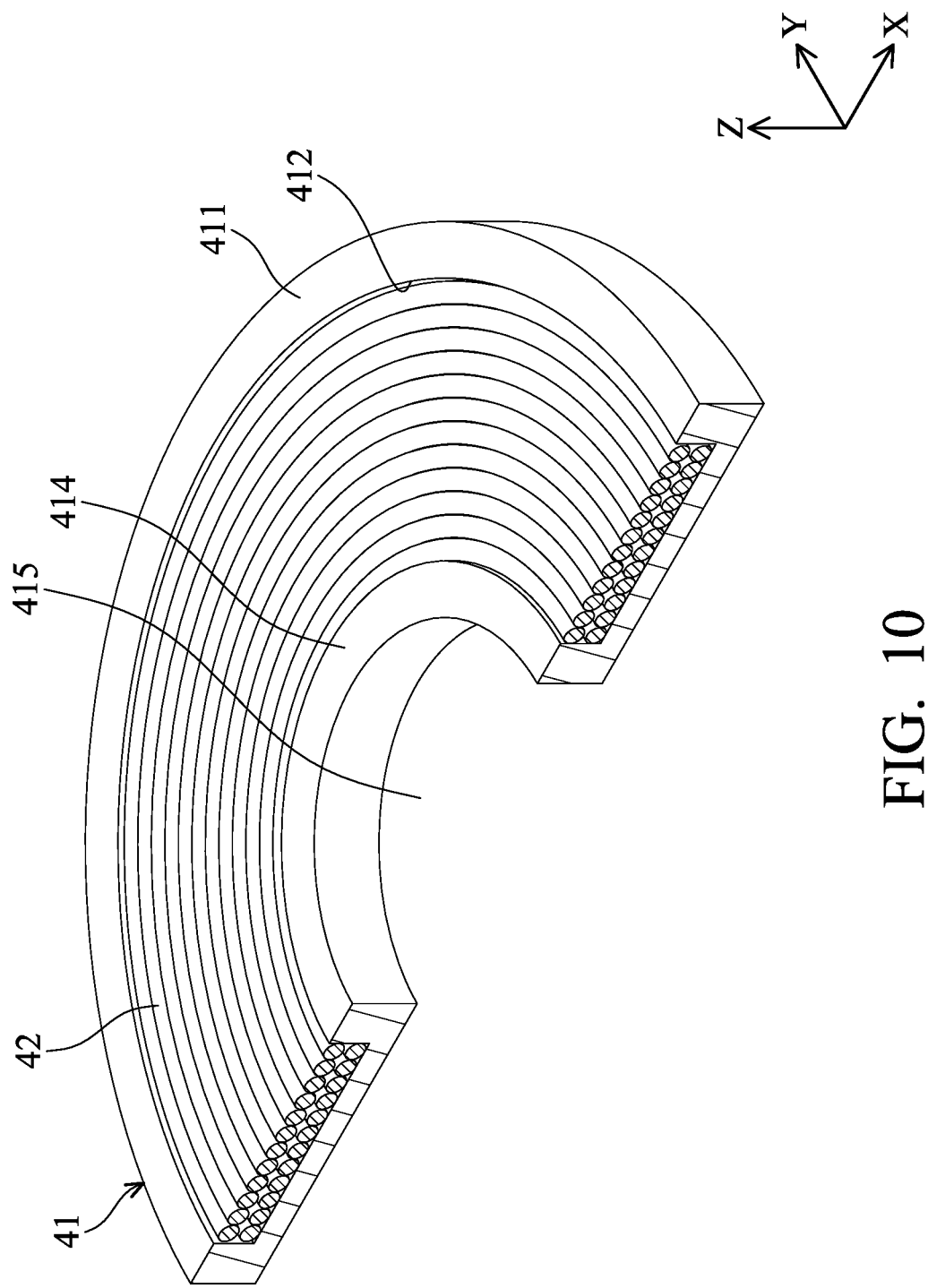
FIG. 10 is a cross-sectional view of the wireless power-charging module 40 taken along line A3-A4 in FIG. 8.
Figure 11:
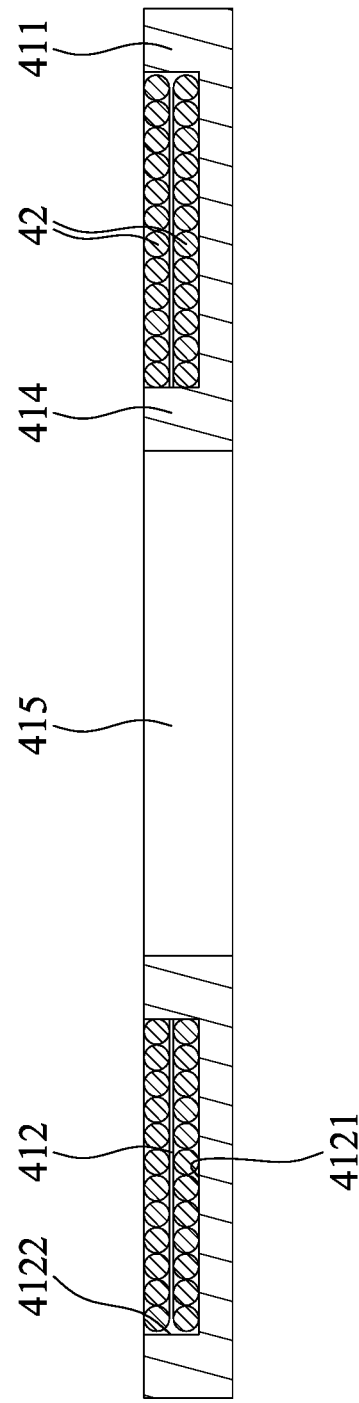
FIG. 11 is another cross-sectional view of the wireless power-charging module 40 taken along line A3-A4 in FIG. 8.

FIG. 8 is a perspective diagram of a wireless power-charging module 40 in accordance with another embodiment of the invention. FIG. 9 is an exploded diagram of the wireless power-charging module 40 in FIG. 8. FIG. 10 is a cross-sectional view of the wireless power-charging module 40 taken along line A3-A4 in FIG. 8. FIG. 11 is another cross-sectional view of the wireless power-charging module 40 taken along line A3-A4 in FIG. 8.

Referring to FIGS. 8-11, the wireless power-charging module 40 in this embodiment comprises a magnetic core 41 and a coil 42. The magnetic core 41 has an annular wall 411, an annular recess 412, an opening 413, a protrusion 414, and a through hole 415. The protrusion 414 has an annular structure surrounding the through hole 415 at the center of the magnetic core 41. The opening 313 is formed on the wall 411, and the recess 412 is formed between the wall 411 and the protrusion 414.

During assembly, the coil 42 is disposed in the recess 412 and surrounds the protrusion 414, and the magnetic glue G is applied to the bottom surface 4121 of the recess 412 (FIG. 11). Furthermore, the magnetic glue G may extend from the bottom surface 4121 to the lateral surface 4122 of the recess 412. It should be noted that the magnetic glue G does not block the top side of the coil 42, thereby ensuring high magnetic field strength in the Z direction (vertical direction) and high power charging efficiency of the wireless power-charging module 40.

Figure 12:
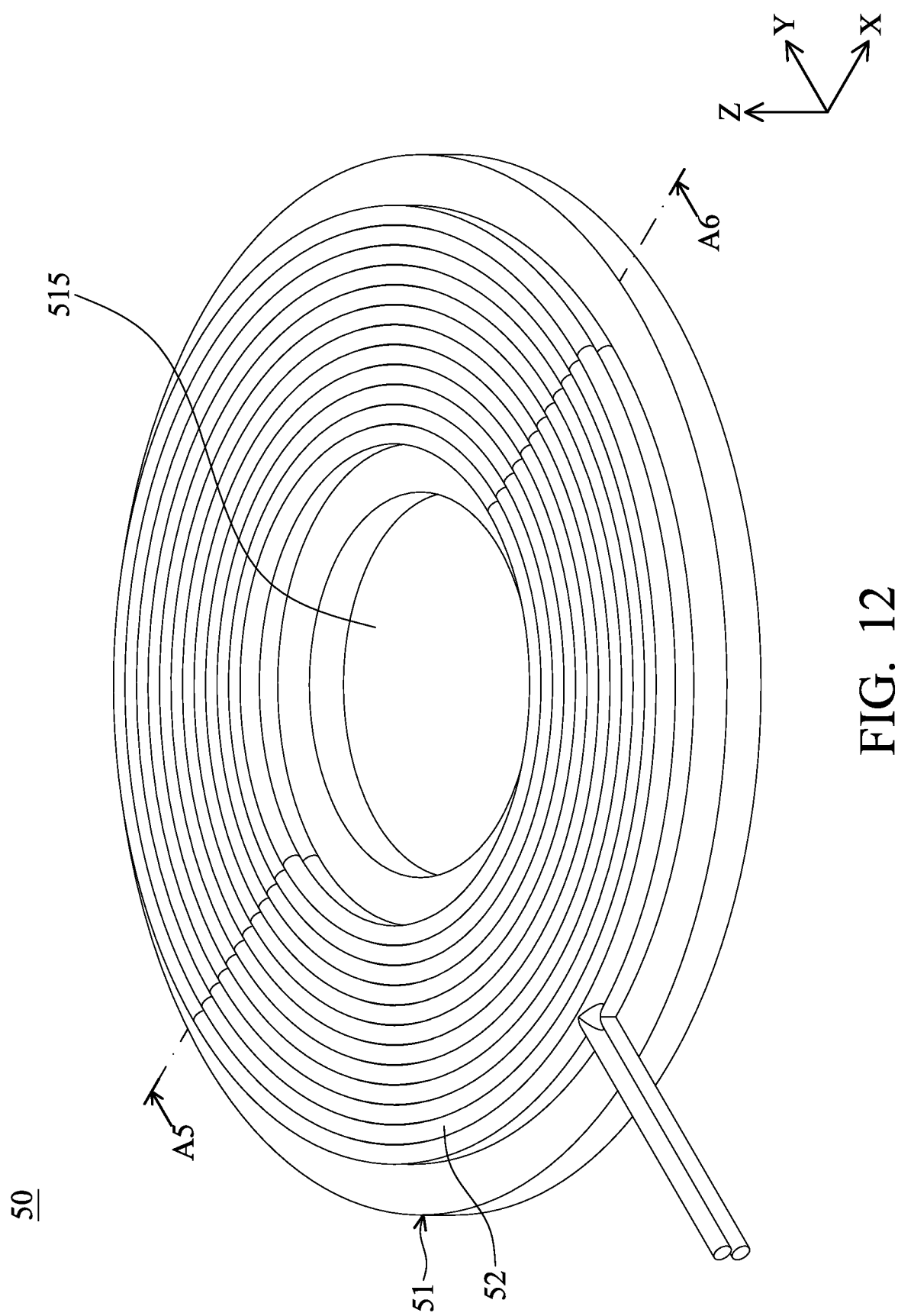
FIG. 12 is a perspective diagram of a wireless power-charging module 50 in accordance with another embodiment of the invention.
Figure 13:
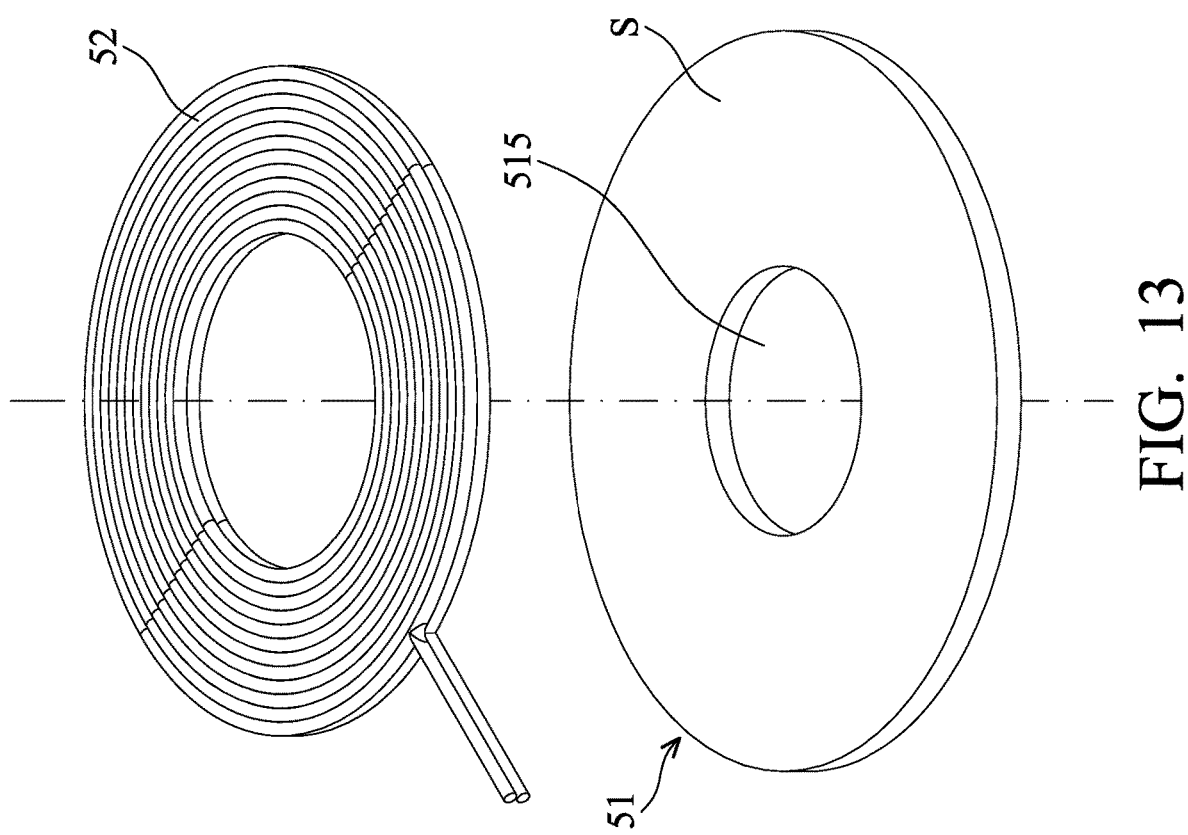
FIG. 13 is an exploded diagram of the wireless power-charging module 50 in FIG. 12.
Figure 14:
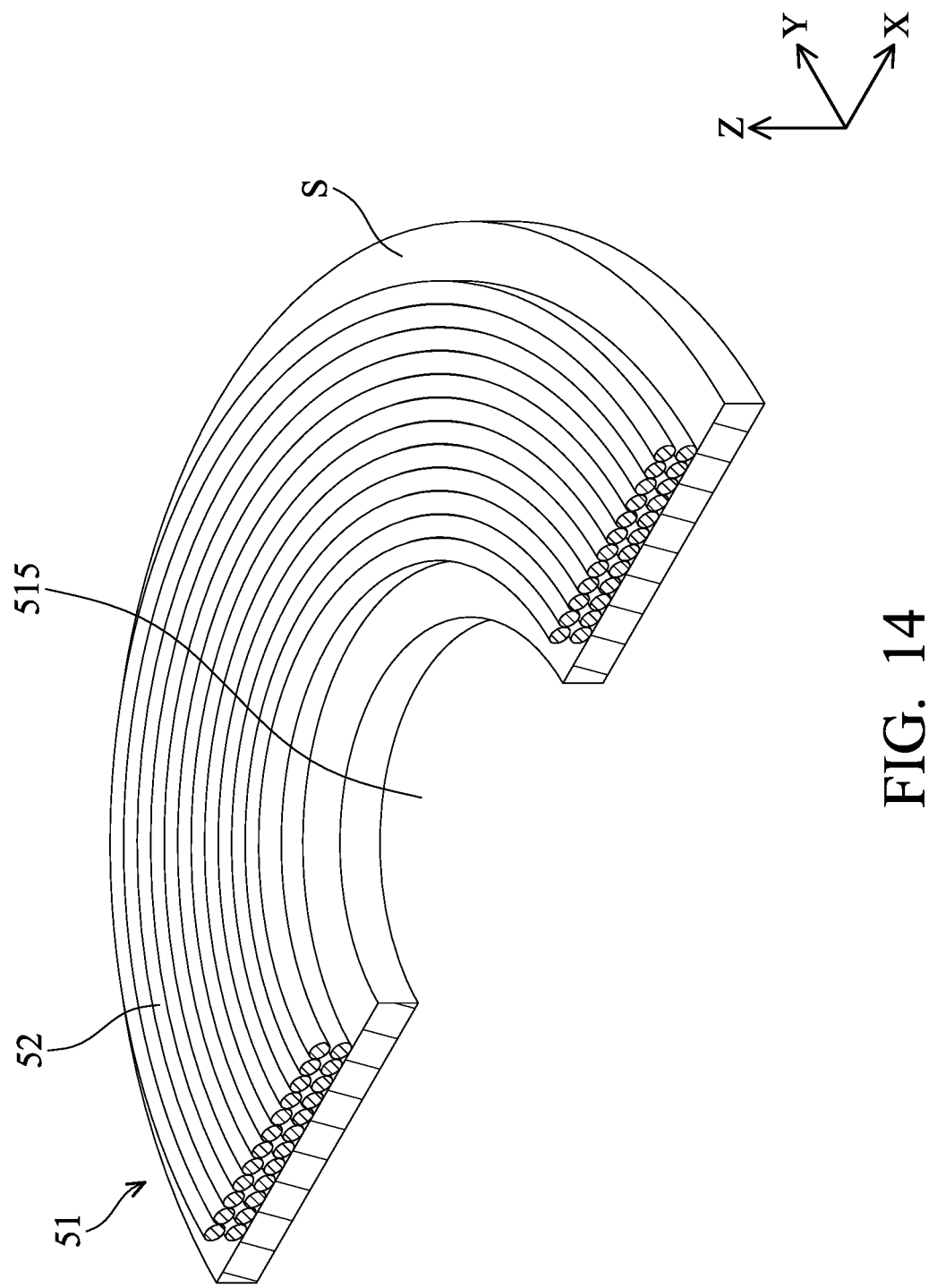
FIG. 14 is a cross-sectional view of the wireless power-charging module 50 taken along line A5-A6 in FIG. 12.
Figure 15:
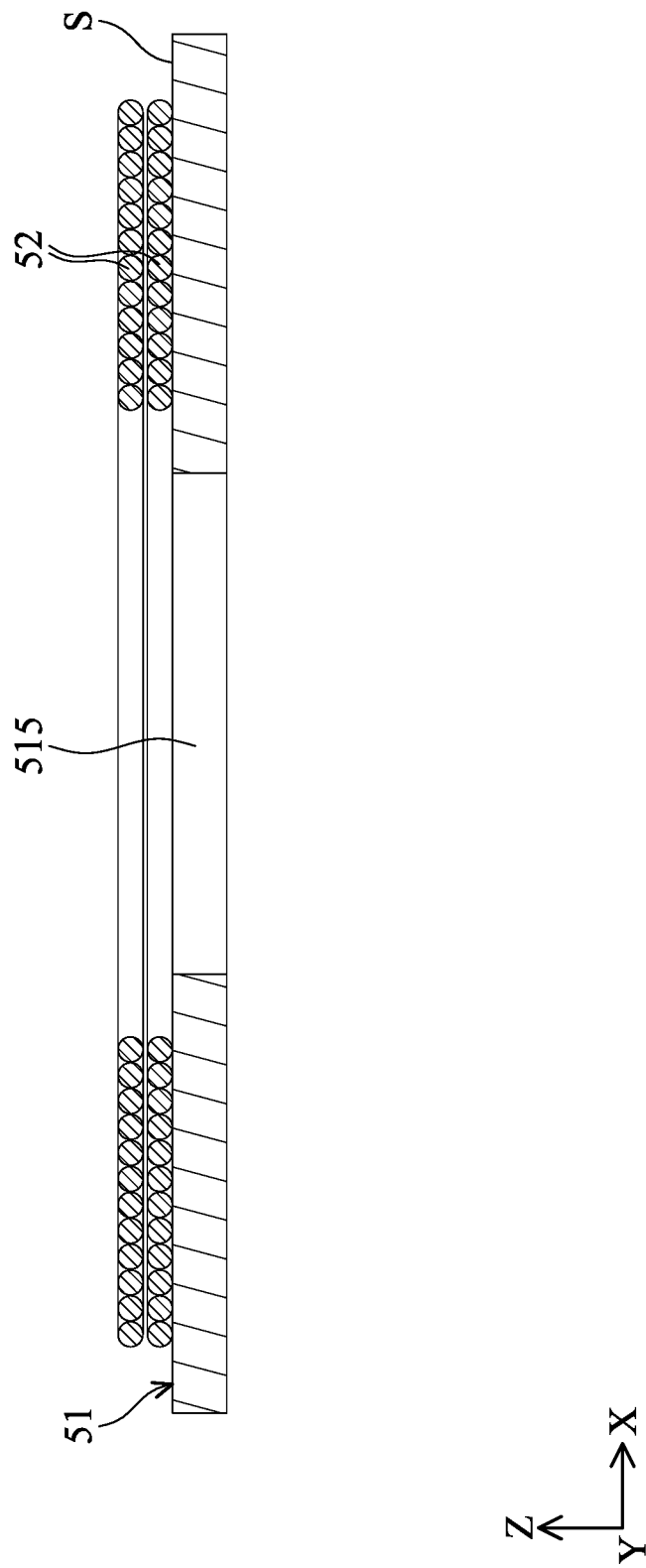
FIG. 15 is another cross-sectional view of the wireless power-charging module 50 taken along line A5-A6 in FIG. 12.
Figure 16:
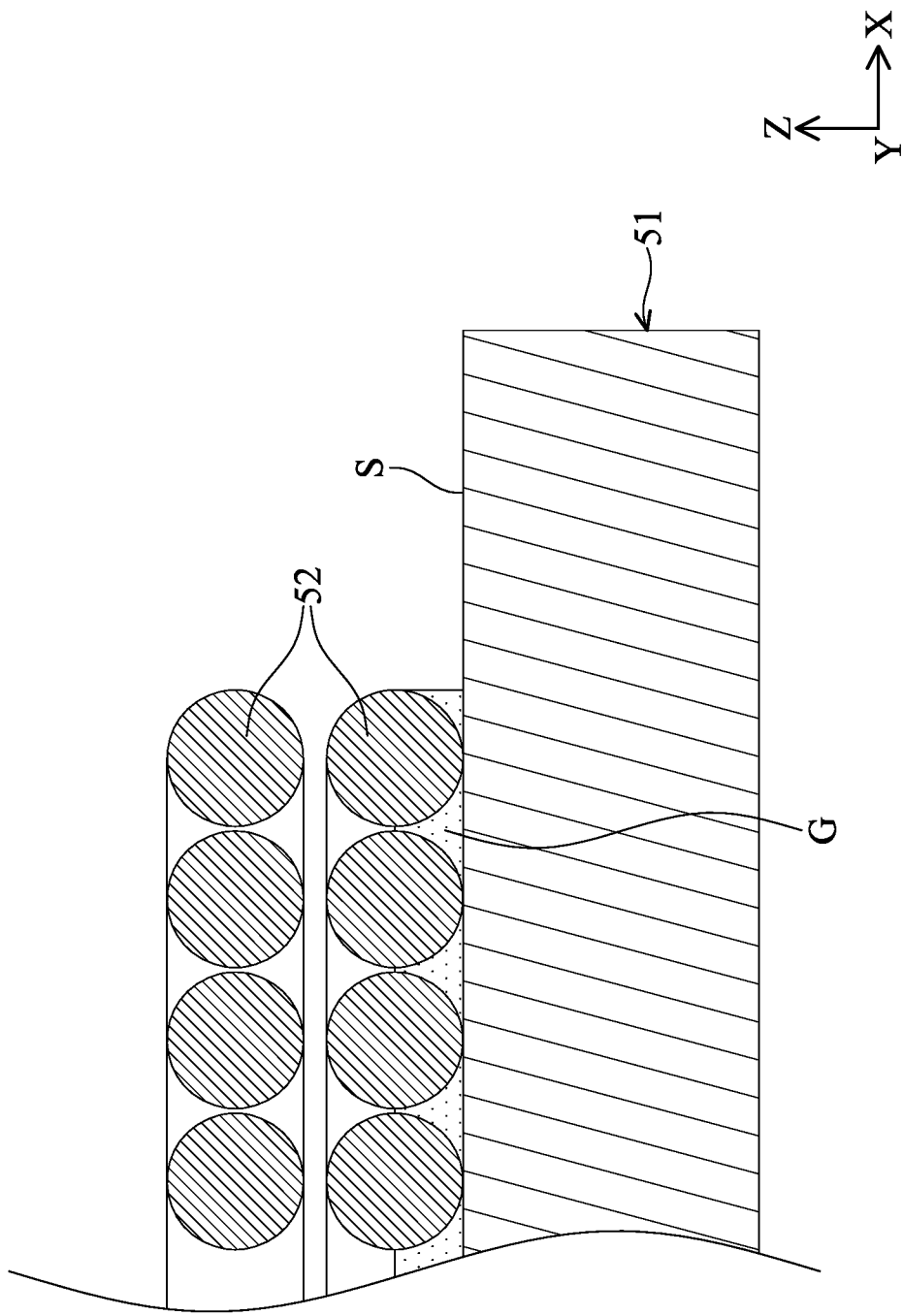
FIG. 16 is a schematic diagram showing the magnetic glue G applied to the surface S of the magnetic core 51 to firmly connect the magnetic core 51 with the coil 52.

FIG. 12 is a perspective diagram of a wireless power-charging module 50 in accordance with another embodiment of the invention. FIG. 13 is an exploded diagram of the wireless power-charging module 50 in FIG. 12. FIG. 14 is a cross-sectional view of the wireless power-charging module 50 taken along line A5-A6 in FIG. 12. FIG. 15 is another cross-sectional view of the wireless power-charging module 50 taken along line A5-A6 in FIG. 12. FIG. 16 is a schematic diagram showing the magnetic glue G applied to the surface S of the magnetic core 51 to firmly connect the magnetic core 51 with the coil 52.

Referring to FIGS. 12-16, the wireless power-charging module 50 in this embodiment comprises a flat magnetic core 51 and a coil 52, wherein the magnetic core 51 forms a through hole 515.

During assembly, the coil 52 is disposed on the surface S of the magnetic core 51 and surrounds the through hole 515. The magnetic glue G is dispensed on the surface S of the magnetic core 51, whereby the magnetic core 51 and the coil 52 are firmly adhered to each other.

It should be noted that the magnetic glue G does not block the top side of the coil 52, whereby high magnetic field strength in the Z direction (vertical direction) and high power charging efficiency of the wireless power-charging module 50 can be achieved.

In summary, the invention provides a wireless power-charging module having the magnetic glue dispensed on the surface of the magnetic core. The gap between the coil and the magnetic core is filled with the magnetic glue. The magnetic glue not only adheres the coil to the magnetic core, but also enhances the magnetic field strength of the wireless power-charging module 30. As a result, the induced voltage in the coil of the wireless power charging receiver can be increased to charge the battery, thereby helping the wireless power-charging module to achieve high power charging efficiency. The magnetic glue may comprise ferrite, ferrite alloy, amorphous alloy, nanocrystalline alloy, or another glue or powder with high magnetic permeability.

It should be noted that the wireless power-charging module may also be used as a wireless power charging receiver that can be electrically connected to a battery, and the magnetic glue can be applied to the surface of the magnetic core to facilitate high power charging efficiency, but the invention is not limited to the embodiments described above.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A wireless power-charging module, comprising:
   a magnetic core;
   a coil, disposed on a surface of the magnetic core; and
   a magnetic glue, disposed on the surface of the magnetic core and used to fill in a gap between the magnetic core and the coil.

2. The wireless power-charging module as claimed in claim 1, wherein the magnetic core has a protrusion at the center of the magnetic core, an annular wall, and an annular recess formed between the wall and the protrusion.

3. The wireless power-charging module as claimed in claim 2, wherein the protrusion forms a through hole.

4. The wireless power-charging module as claimed in claim 2, wherein the magnetic core further has an opening formed on the wall, and the coil extends through the opening.

5. The wireless power-charging module as claimed in claim 2, wherein the surface is a bottom surface of the recess, and the magnetic glue is spread over the entire bottom surface.

6. The wireless power-charging module as claimed in claim 2, wherein the surface is the bottom surface of the recess, and the magnetic glue extends from the bottom surface to a lateral surface of the recess, wherein the lateral surface is adjacent to the bottom surface.

7. The wireless power-charging module as claimed in claim 6, wherein the magnetic glue is spread over the entire lateral surface.

8. The wireless power-charging module as claimed in claim 1, wherein the magnetic core has a flat structure that forms a through hole, and the coil surrounds the through hole.

9. The wireless power-charging module as claimed in claim 1, wherein the magnetic glue comprises ferrite, ferrite alloy, amorphous alloy, or nanocrystalline alloy.

10. The wireless power-charging module as claimed in claim 1, wherein the coil comprises a planar coil.

* * * * *